(12) United States Patent
Diekhans

(10) Patent No.: US 6,415,229 B1
(45) Date of Patent: Jul. 2, 2002

(54) SYSTEM FOR POSITION DETERMINATION OF MOBILE OBJECTS, IN PARTICULAR VEHICLES

(75) Inventor: Norbert Diekhans, Gütersloh (DE)

(73) Assignee: Claas KGaA, Harsewinkel (DE)

( * ) Notice: Subject to any disclaimer, the term of this patent is extended or adjusted under 35 U.S.C. 154(b) by 0 days.

(21) Appl. No.: 08/880,968

(22) Filed: Jun. 23, 1997

(30) Foreign Application Priority Data

Jun. 21, 1996 (DE) .......................................... 196 24 719

(51) Int. Cl.[7] ................................................. H04N 7/24
(52) U.S. Cl. ........................ 701/214; 701/215; 342/357; 342/463
(58) Field of Search ................................ 701/214, 215, 701/224, 213; 342/463, 357

(56) References Cited

U.S. PATENT DOCUMENTS

| | | | |
|---|---|---|---|
| 5,225,842 A | 7/1993 | Brown et al. | 342/357.09 |
| 5,323,322 A | 6/1994 | Mueller et al. | 701/215 |
| 5,365,447 A | 11/1994 | Dennis | 701/215 |
| 5,436,632 A | 7/1995 | Sheynblat | 342/357.03 |
| 5,467,282 A | 11/1995 | Dennis | 701/215 |
| 5,477,228 A | 12/1995 | Tiwar et al. | 342/357.03 |
| 5,477,458 A | * 12/1995 | Loomis | 701/215 |

FOREIGN PATENT DOCUMENTS

| | | |
|---|---|---|
| DE | 41 36 136 C1 | 3/1993 |
| DE | 14 24 412 A1 | 1/1996 |
| DE | 44 23 328 A1 | 1/1996 |
| WO | WO 95/1879 | 7/1995 |
| WO | WO 95/18977 | 7/1995 |

OTHER PUBLICATIONS

"DGPS–Navigation Mit RDS" by Matthias Faul and Martin Ohsmann, Aug. 1995.

\* cited by examiner

Primary Examiner—William A. Cuchlinski, Jr.
Assistant Examiner—Arthur D. Donnelly
(74) Attorney, Agent, or Firm—Michael J. Striker

(57) ABSTRACT

A system of positioning mobile objects has a satellite receiving unit arrangeable on a mobile object, a plurality of navigation satellites rotating on earth's orbits so that their positions continuously change relative to a stationary point, and so that satellite signals are received by the satellite receiving unit for determination of their position coordinates, a stationary reference satellite receiving station arranged so that the satellite receiving unit of the mobile object receives a correction signal with correction data from the stationary reference satellite receiving unit for exactly known position coordinates and for a computation of corrected position data, an electronic evaluating and processing unit through which the correction signals received from at least two reference satellite receiving stations are supplied, the evaluating and processing unit determining from the correction signals of the different stationary reference satellite receiving stations an optimal error correction signal, so as to transmit the determined error correction signal as a correction signal to the satellite receiving unit arranged on the object for a position correction.

24 Claims, 5 Drawing Sheets

SYSTEM FOR POSITION DETERMINATION OF MOBILE OBJECTS, IN PARTICULAR VEHICLES

BACKGROUND OF THE INVENTION

The present invention relates to a system for position determination of mobile objects, in particular vehicles.

It is known to use the GPS satellite navigation system (Global Positioning System) for positioning mobile objects, in particular vehicles. For this purpose a satellite receiving unit (GPS receiver) is installed on the mobile object (vehicle) which receives satellite signals for determination of their position coordinate (geographic width and length as well as the height over normal zero or kartesian coordinates X, Y, Z) from several not geostationary GPS navigation satellites which rotate on their orbits. The navigation satellites surround the earth on six orbits, and four satellites are located on each orbit. The conventional GPS receivers are as a rule designed so that the signals from four different navigation satellites can be received. The satellites send substantially their identification codes, a height-accurate, synchronized time, and their corresponding position. The GPS receivers calculate the distance to corresponding GP satellites, by measuring the time (running time measurements), over which the signals travel the from satellite to the receiver. Thereby with the suitable evaluation process, three-dimensional position determinations are performed. With such a system, however, only an accuracy of approximately, ±100 m is obtained. The inaccuracy has various causes. One reason is the artificial worsening of the GPS satellite signals for many users, in contrast to authorized military users. A further reasons are orbit errors of the navigation satellites as well as inaccuracies of the satellite clocks. During passage of the satellite signal, its way to the GPS receiver through the ionosphere and troposphere further inaccuracies occur because of the alternating action with the propagation medium. Moreover, the constellation of the satellites in "visible field" of the GPS receiver influences the accuracy. An accuracy +/−100 m is however not sufficient for many applications.

For these reasons a standard navigation system for automobile is reinforced, in addition to the GPS receiver, during the travel with various sensors arranged on the vehicle, such as for example wheels sensors, a speed measuring device, direction sensors/steering angle sensors, which produce data in connection with digitalized street maps. In this way, an accuracy which is sufficient for a travel route guidance for the position determination is obtained. This system however presumes that the mobile object moves only on known streets which are stored with digitalized street card. The higher accuracy requires thereby a limitation to the "movement freedom" provided by the system. The system is not suitable to be used for position determination of vehicles for example in the agriculture, since a field does not have characteristic features required for the above described system, such as laterally limited streets with defined widths, indicated holding points such as intersections, road overpasses, curves with small curve radius.

Another alternative for the increase of the accuracy of the GPS satellite navigation system are so-called differential GPS system (DGPS). Here a stationary reference GPS receiver with exactly known position coordinates determines correction data for the above described errors (for example orbit errors, time error). These correction data in form of a correction signal are transmitted to the mobile GPS receiver for example by radio. From this correction signal, the mobile GPS receiver calculates corrected position data. Such a system is disclosed for example in the German patent document DE 41 36 136. In this reference, it is described how the radio sensor is used for sending the correction signals. The presumption for the efficient use of such a DGPS System is that the mobile GPS receiver receives three or four corresponding satellites, which also receives the reference GPS receiver and makes available for the correction data. Moreover, the error for the mobile GPS receiver and the reference receiver must be the same. This however is not the situation when the reference GPS receiver and the mobile GPS receiver are assembled very close. With the great distances between reference GPS receiver and the mobile GPS receiver, these presumptions are no longer valid, since then especially the atmospherically caused error (influence of the ionosphere, troposphere) are different influences, since the satellite signals cover different paths. With such a DGPS System, the accuracy of approximately ±5 m can be obtained. However, with the required radio connection a further disturbance source is provided in the positioning system. In accordance with several measurements, errors of up to 50% of the operational time are possible.

SUMMARY OF THE INVENTION

Accordingly, it is an object of the present invention to provide a system for position determination of mobile objects, which avoids the disadvantages of the prior art.

More particularly, it is an object of present invention to provide a system for position determination of mobile object based on a satellite navigation system, which is improved in simple and cost-efficient way as to the accuracy and reliability, and also to provide a method of improvement of the position determination.

In keeping with these objects and with others which will become apparent hereinafter, one feature of present invention resides, briefly stated, in a system for position determination of mobile objects, in which correction signals are received from two or more stationary reference satellite receiving stations and supplied to an electronic evaluating and processing unit. In the evaluating and processing unit from the correction signals, different reference satellite receiving stations determine with an evaluating algorithm an improved error correction signal. The thusly determined error correction signal is then transferred as a correction signal to the satellite receiving unit arranged on a moveable object for a position correction.

The evaluation algorithm contains quality criteria, with which the quality of different selection signals is continuously evaluated. It is therefore provided in a design of the inventive system to compare the different correction signals with one another and to determine the best correction signal on the satellite receiving unit arranged on the mobile object for position correction.

In accordance with a further feature of the inventive system, it is provided that the different correction signals are combined with one another. This can be performed for example by an average value formation. Moreover, it is provided for example to remove the correction data for the orbit error of the satellite from the correction signal 1 and the correction data for the influence of the ionosphere from the correction signal 2.

With the inventive system the accuracy and reliability of the position determination of mobile objects is substantially improved when compared with the simple differential GPS system which evaluates only a correction signal. The obtainable accuracy is within the region of ±1 m. Thereby the applications can include such as for example the position differentiated and controlled regulation of working organs in the agriculture (application of fertilization and plant protective substances, product mapping, etc.). In addition to the accuracy, also the reliability of the system is increased since no longer the dependency from a single, eventually not permanently available reference station is provided.

The inventive system is not limited to the position determination of vehicles. For example, it can be used for mobile GPS receiver which are carried by operators for positioning purposes.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
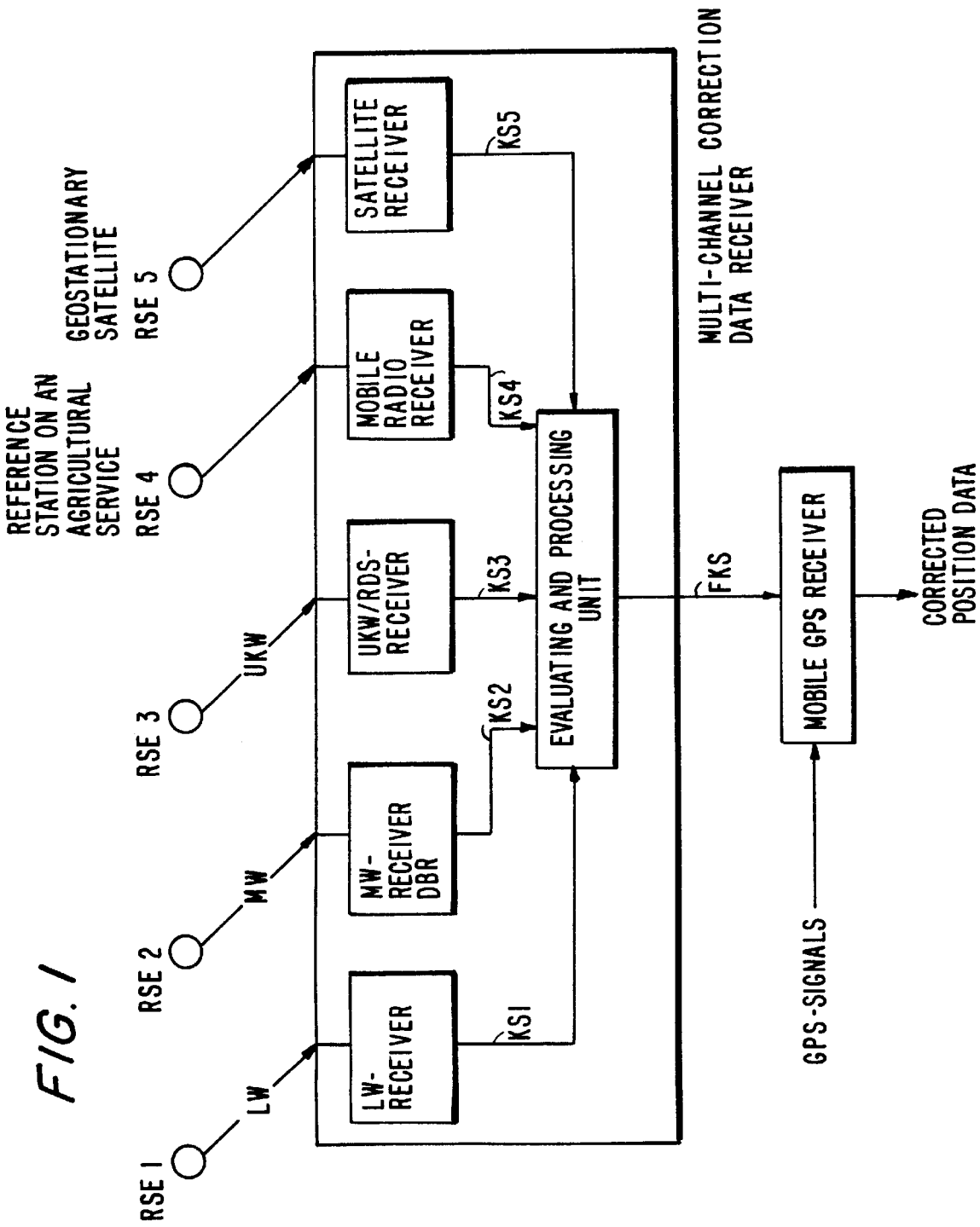
FIG. 1 is a view showing a block diagram of a system for position determination of mobile objects in accordance with the present invention.

FIG. 1 is a view showing a block diagram of a system for position determination of movable objects in accordance with present invention, with a multi-channel correction data receiver with an electronic evaluating and processing unit which determines an optimal error correction signal (FKS) from different correction signals (KS1 ..., KS5). The thusly determined error correction signal (FKS) is transmitted to a GPS satellite receiving unit which is arranged on a mobile object (which means also a GPS receiver carried by a person).

In the design of the system, the evaluating and processing unit is integrated in the multi-channel correction data receiver. In an alternative embodiment, the evaluation and processing unit can be formed as separate components (for example as PC or notebook) outside the multi-channel correction data receiver.

Figure 3:
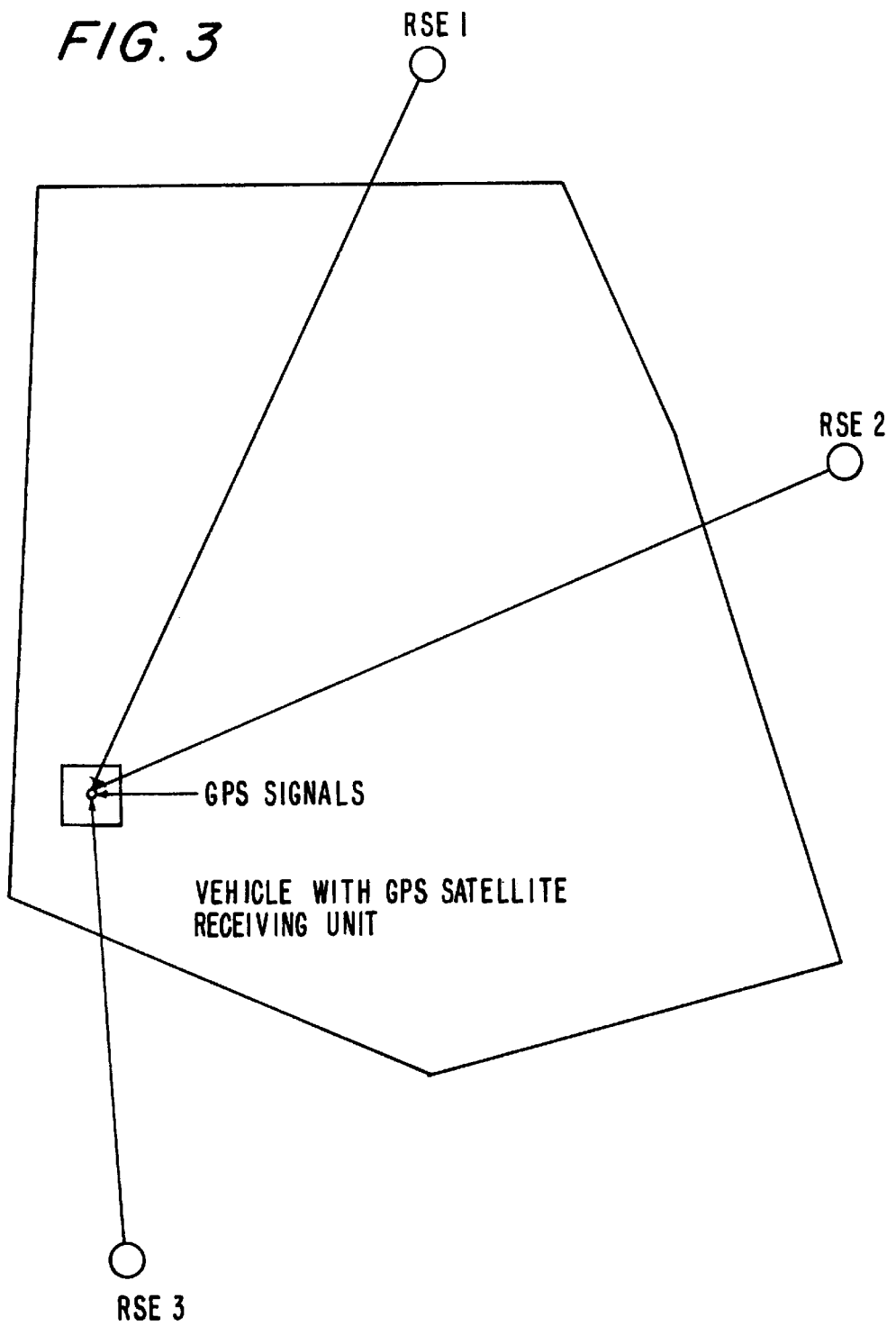
FIG. 3 is a view schematically showing components of the system including a vehicle with a GPS receiver, a navigation satellite and a reference GPS receiver.

The evaluating and processing unit can be located on the mobile object, on which also the GPS satellite receiving unit is installed as shown in FIG. 3. The data transmission (transmission of the error correction signals) from the evaluating and processing unit to the GPS satellite receiving unit is performed through a cable (for example the serial interface). It is further provided to integrate the evaluating and processing unit in the mobile GPS receiving unit.

Figure 4:
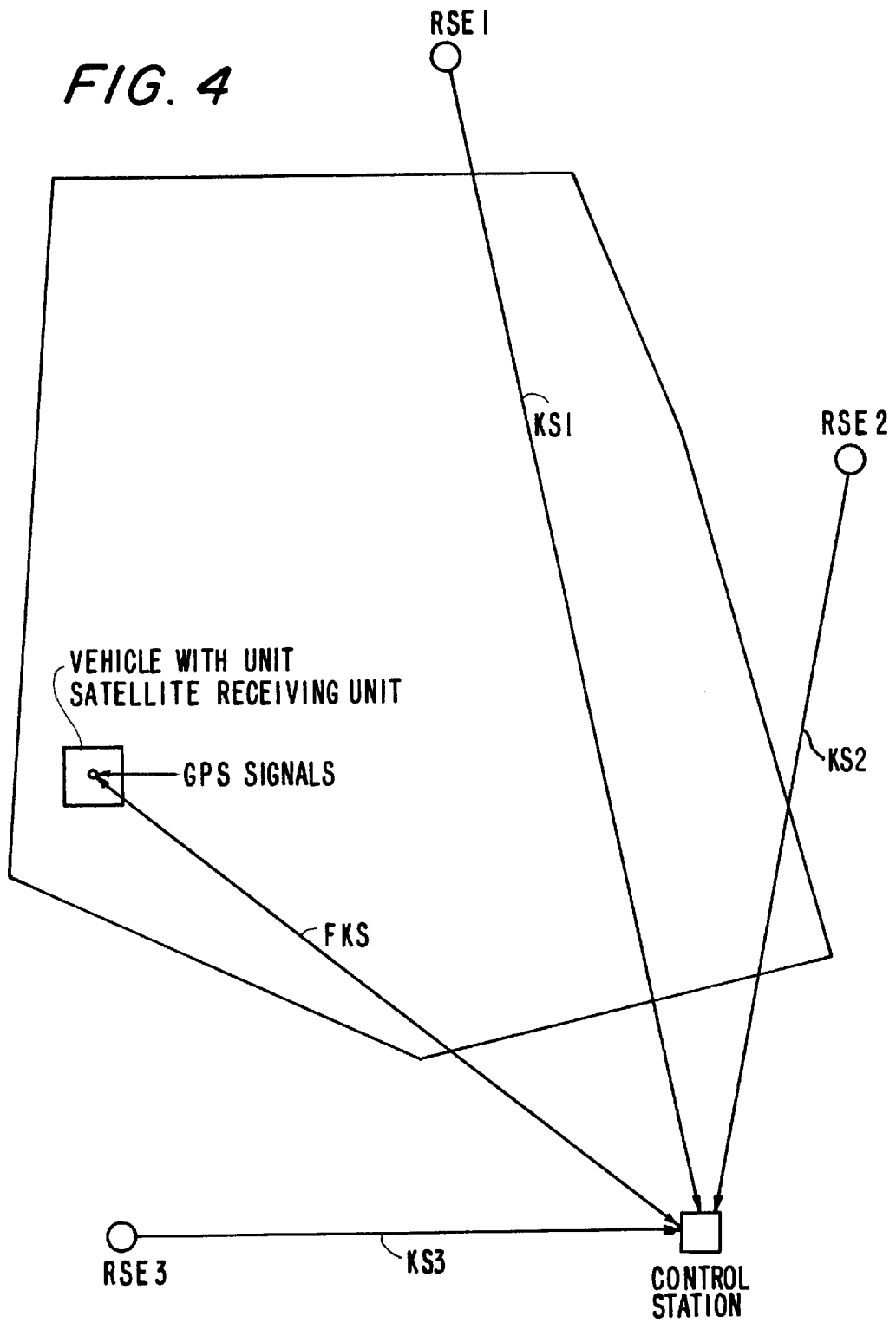
FIG. 4 is a view schematically showing components of the inventive system with three reference GPS receiver and one control station.

In accordance with another embodiment of the system, the evaluating and processing unit is a component of a correction data control station as shown in FIG. 4. The control station receives from different reference satellite receiving stations (RES 1 ... ) correction signals (KS1, ... ). The improved/selected error correction signal (FKS) is then sent by radio to the mobile GPS receiver. The improved error correction signal (FKS) is preferably sent in a standard format, in which also the correction signals (KS1 ... ) are sent from the reference satellite receiving station (RES 1 ... ). The standard is the RTCM format (Radio Technical Commission for Maritime Services). Thereby the system of conventional DGPS receivers can be used, which are correspondingly designed for the reception of a correction signal in the RTCM format.

In FIG. 1 for example five different reference satellite receiving stations (RES1, ... ) are shown, and their correction signals (KS1 ... ) are transmitted by radio in different frequency regions.

The first reference station sends it control signals (KS1) through the medium which is long wave range. Long waves (30–300 kHz) propagate as ground waves to several thousand kilometers. The prepagation conditions are substantially independent from the solar activity and the time of the year. There is however a weak influence of the day time, so that at night the signals are somewhat stronger than during the day. Ground waves and space waves operate full day. Space waves reach steeply penetrate the ionosphere and are reflected there, and simultaneously strongly dampened. Great sending powers guarantee the stable ranges which are substantially independent from the condition of the ionosphere. The long waves range, when compared with UKW have the advantage that the signal attenuations and multipath reception no longer occur. For example for covering inside Germany, an LW reference station is sufficient, whereby for example greater distances between the mobile GPS user and the reference station are provided, which for example mean a relatively greater distance of the GPS satellite signal error between the mobile GPS receiver and the reference station.

The second reference station sends its control signal (KS2) through the medium which is a medium wave range. For the navigation DGPS correction signals in marine radio fire frequency band of 283.5–325 kHz are emitted. For the reception of this signal a so-called "Differential Beacon Receiver" (DBR) can be used. Medium range waves are effective practically only as ground waves. They are dampened stronger than LW. Because of the improved antenna efficiency grade it can be sent however with a lower power. In view of a so-called "twilight effect" especially during the time of sunrise and sunset and during the night it is necessary to consider interference phenomenon between the space and ground waves, it leads to carrier decline phenomenon (fading), so that temporary the reception of the correction signal (KS2) is not possible.

The third reference station sends its control signal (KS3) over the medium which is ultrashort waves (UKW). The propagation of UKW (30–300 MHz) is performed with optically well visibility practically without losses. The propagation conditions are determined by reflection (multipath reception) and attenuation, which leads to the decline phenomena. High data rates are possible.

The fourth reference station is a base station which is adjusted for example to an agricultural operation and its correction signals are sent through a mobile radio frequency. For example, this basic station is simultaneously a correction data control station which receives several correction signals. The improved error correction signal (FKS) received by the evaluating and processing unit is adjusted to be available in the agriculture.

The fifth reference satellite station is a ground station which receives the GPS satellite signal and in turn sends the satellite correction signal (KS5) through a geo stationary communication satellite. At least one of the reference satellite stations can emit its signals through digital audio broadcast (DAB). The emission can be performed in American standardized data format (RTCM-SC104).

The mobile satellite receiving station and at least one of the reference satellite receiving stations can receive in addition the L1 and/or the L2 frequency of the Navstar satellites, and can additionally perform correspondingly an evaluation of the phase displacement for the L1 and/or L2 frequency (so-called P-DGPS).

Figure 2:
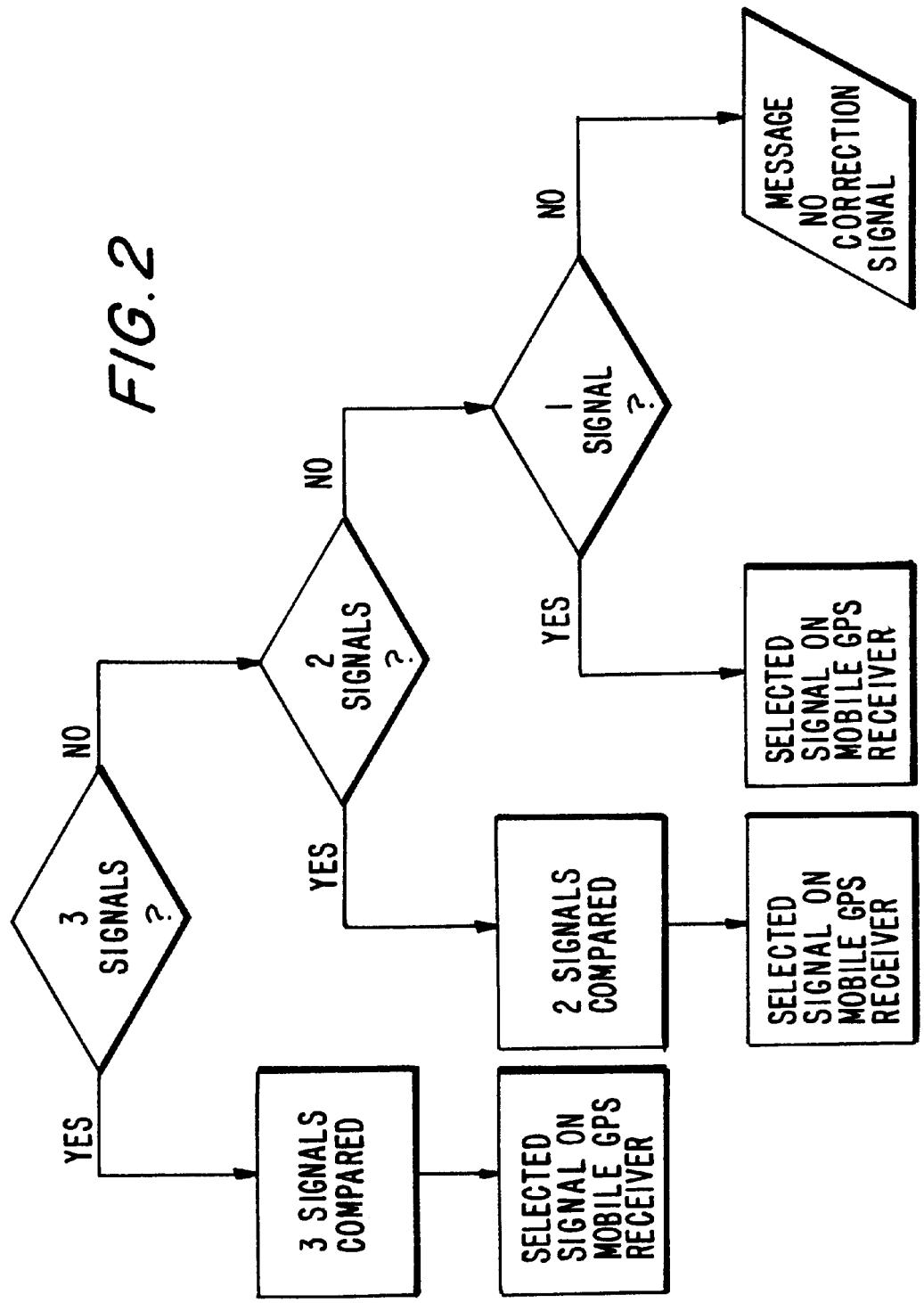
FIG. 2 is a flow chart for evaluation of correction signals in the inventive system.

FIG. 2 shows a flow chart for evaluation of a system with for example three correction signals (KS1, KS2, KS3). First an inquiry of the number of the signals which are receivable is performed. Then the signals are compared in connection with quality criteria with one another, and the best signal is transmitted to the mobile satellite receiving unit for a position correction. In addition to the selection of a correction signal, also an averaging of the different correction signals or a selective selection of correction data is provided from the different correction signals. For example the advantages of LW, MW and UKW reference stations can be combined in a favorable way with one another in dependence on time of the day, weather and the distance. It is provided that the quality criteria for judging the quality of the correction signals take into consideration the following:

- the number of the navigation satellites from which a reference station receives GPS signals,
- the age of the correction signals,
- the field intensity or intensity of the receiving correction signal,
- the local statistic availability of the correction signals,
- the distance between the mobile GPS receiver and the reference station,
- the geometric satellite constellation of the navigation stations, from which a reference station receives the GPS signals.

Figure 5:
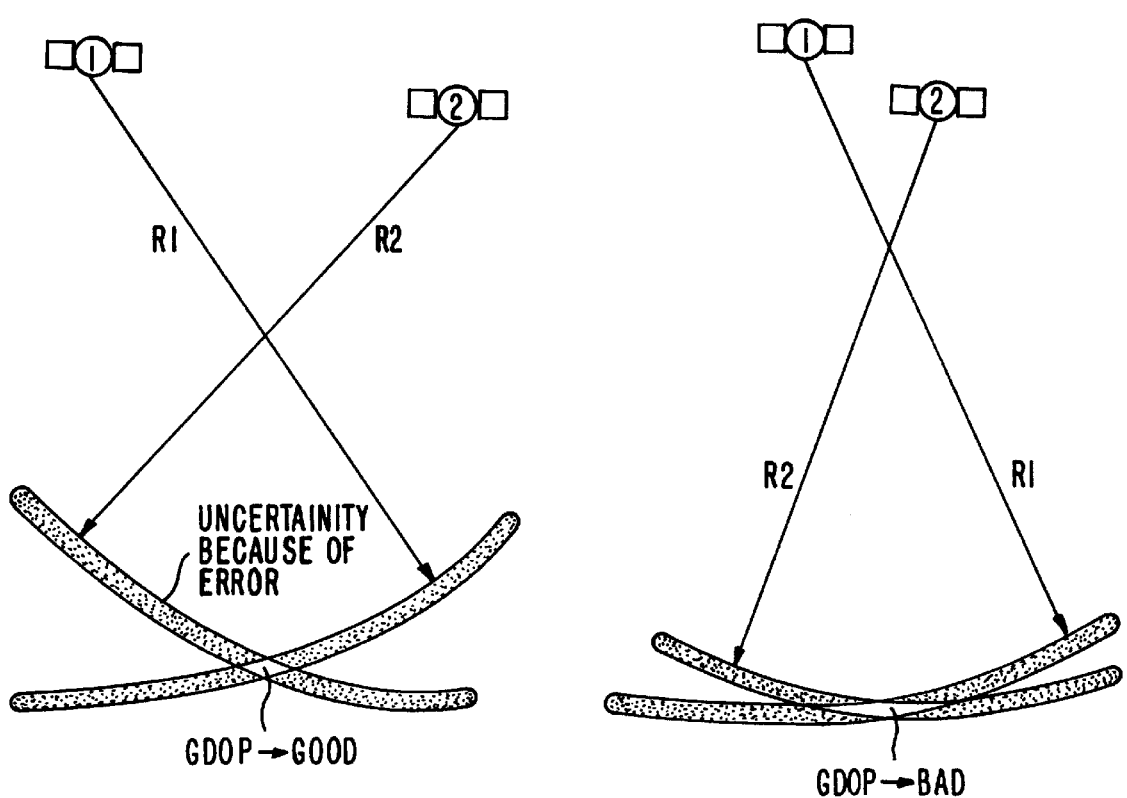
FIGS. 5 and 6 are schematic representation of influence of the satellite navigation on the accuracy of the inventive system.
Figure 6:
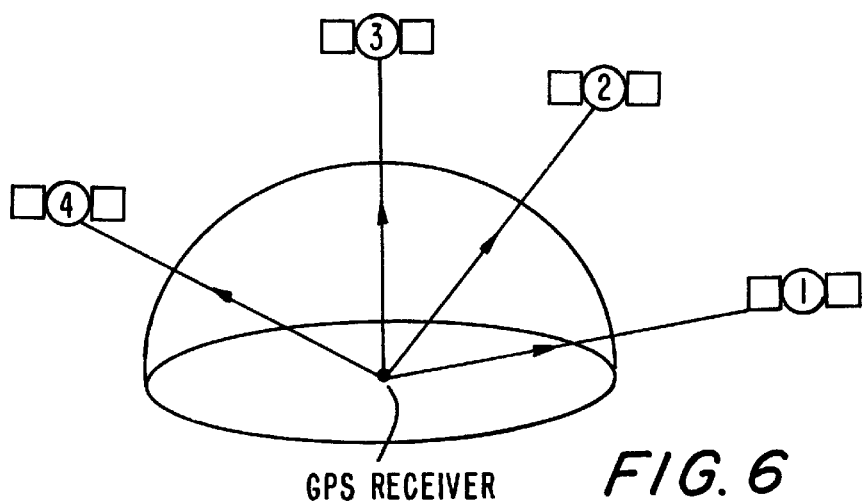

The influence of the satellite constellation on the accuracy of the position determination and thereby the quality of the correction signal will be explained with reference to FIGS. 5 and 6. The geometrical influence on the reduction of the accuracy (DOP: Dilution of Precision) can be explained in connection with the problem to determine the intersecting point between two intersecting lines with a predetermined line density as shown in FIG. 5. The line density corresponds to the inaccuracy ($\Delta R$) in the distance determination to a GPS satellite. The wider the line, in other words, the greater the inaccuracy in the distance determination to a GPS satellite, the flatter the intersecting angle of the intersecting lines, the greater the position inaccuracy. The GDOP-value (geometric DOP) for the satellite constellation in the left half is therefore more favorable than for the constellation in the right half.

For the position error in the navigation practice the three-dimensional PDOP (position DOP) is important. This factor can be understood geometrically as the volume of tetraheder, covered by the directions to the four satellites. Its volume is inversely proportional to the PDOP value. The best value is obtained when three satellites stand at the same angular distances of 120° closely over the horizon and the fourth is located perpendicular over the GPS receiver.

Instead or additionally to the Navstar GPS, which deals with differently intensely code error rates, also selectively the reference and mobile stations can operate on the basis of the Russian GLONASS whose signals are not falsified in time by error rates.

It will be understood that each of the elements described above, or two or more together, may also find a useful application in other types of constructions differing from the types described above.

While the invention has been illustrated and described as embodied in system for positioning of mobile objects, in particular vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said satellite receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction.

2. A system as defined in claim 1, wherein said means for evaluating evaluate the quality criteria for evaluating the quality of the correction signal which quality criteria is a number of the navigation satellites, from which the reference satellite receiving station receives satellite signals.

3. A system as defined in claim 1, wherein said means for evaluating evaluate the quality criteria for evaluation the quality of the correction signal which quality criteria is a geometrical satellite constellation of position dilution of precision, from which the reference satellite receiving station receives the satellite signal.

4. A system as defined in claim 1, wherein said means for evaluating evaluate the quality criteria for evaluation the quality of the correction signal which is a field intensity of the correction signal received from the reference satellite receiving station by radio.

5. A system as defined in claim 1, wherein said means for evaluating evaluate the quality criteria for evaluation of the quality of correction signal which is an age of the correction signal.

6. A system as defined in claim 1, wherein said means for evaluating evaluate the quality criteria for evaluation the quality of the correction signal which is a local statistic availability of the correction signal transmitted by radio from the reference satellite receiving station.

7. A system as defined in claim 1, wherein said evaluating means evaluate the quality criteria for evaluation of the quality of the correction signal which is a spacial distance between a corresponding reference satellite receiving station and the mobile satellite receiving unit.

8. A system as defined in claim 1, wherein said evaluating means evaluate the quality criteria for evaluation of the quality of the correction signal which quality criteria is a selection of individual correction data, so that the selected correction data are assembled to a new correction data set and transmitted as an error correction signal to the satellite receiving unit of the mobile object.

9. A system as defined in claim 1, wherein said evaluating and processing unit for the correction signals of the different stationary reference satellite receiving stations is integrated in the satellite receiving unit of the mobile object.

10. A system as defined in claim 1, wherein said at least one of said reference satellite receiving units sends its correction signals through a radio transmitter, and the correction signal is joined in a radio data signal.

11. A system as defined in claim 1, wherein at least one of said reference satellite receiving stations emits its correction signals through a mobile radio transmission station.

12. A system as defined in claim 1, wherein said mobile satellite receiving station and at least one of said reference satellite receiving stations receives L1 and/or L2 frequency of Navstar satellites.

13. A system as defined in claim 12, wherein said mobile of satellite receiving station and at least one of said reference satellite receiving stations additionally performs an evaluation of a phase displacement for the L1 and/or L2 frequency.

14. A system as defined in claim 1, wherein at least one of said reference satellite receiving stations operates on the basis of Russian GLONASS.

15. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction; and means for averaging the correction signals.

16. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, said evaluating and processing unit for the correction signals of different stationary reference satellite receiving stations being arranged on the mobile object, on which also the satellite receiving unit is arranged.

17. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, at least one of the reference satellite receiving stations sending its correction signals through a LW sending frequency.

18. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, at least one of the reference satellite receiving units sending its correction signals through a MW sending frequency.

19. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, said at least one of said reference satellite receiving stations sending its correction signals through a UKW sending frequency.

20. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, at least one of said reference satellite receiving stations emitting its correction signal through a geo stationary satellite.

21. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, at least one of said reference stations emitting its correction signals through a digital audio broadcast.

22. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction, at least one of said reference stations emitting its correction signals in a standardized data format RTCM-SC104.

23. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction; and means for evaluating the correction signals obtained from the different reference satellite receiving stations in accordance with definite quality criteria as to their quality and comparing them with one another so as to obtain a best correction signal which is sent to the satellite receiving unit arranged on the mobile object for a position correction.

24. A system of positioning mobile objects, comprising a satellite receiving unit arrangeable on a mobile object; a plurality of navigation satellites rotating on earth's orbits so that their positions continuously change relative to a stationary point, and so that satellite signals are received by said satellite receiving unit for determination of their position coordinates; a stationary reference satellite receiving station arranged so that said receiving unit of said mobile object receives a correction signal with correction data from said stationary reference satellite receiving station for exactly known position coordinates and for a computation of corrected position data; an electronic evaluating and processing unit through which the correction signals received from at least two reference satellite receiving stations are supplied, said evaluating and processing unit determining from said correction signals of the different stationary reference satellite receiving stations an optimal error correction signal, so as to transmit the determined error correction signal as a correction signal to said satellite receiving unit arranged on the object for a position correction; and an integrated multi-channel correction data receiver which is capable of receiving correction data simultaneously on at least two different channels.

* * * * *